R. MANY.
HOSE CONSTRUCTION.
APPLICATION FILED FEB. 23, 1915.
1,149,664.
Patented Aug. 10, 1915.
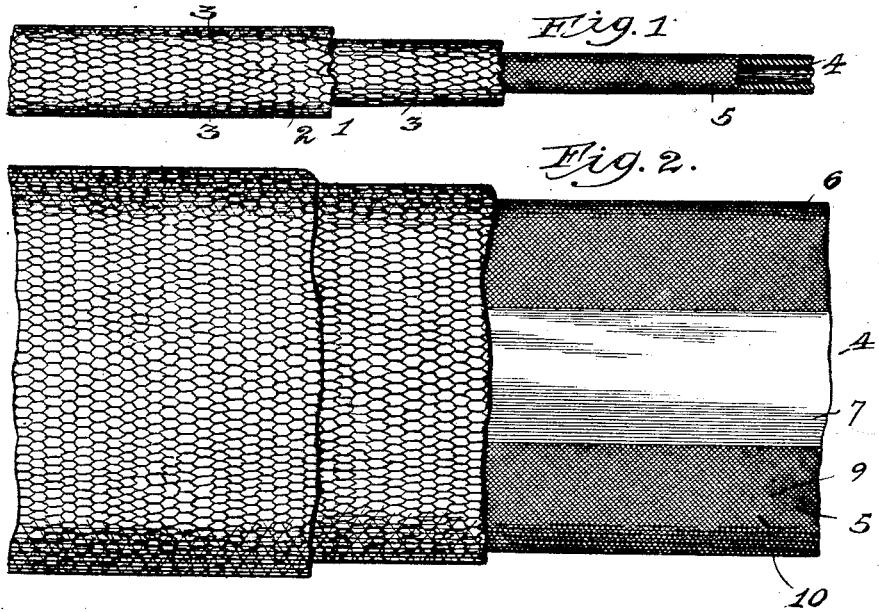
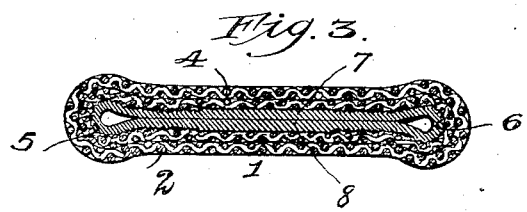
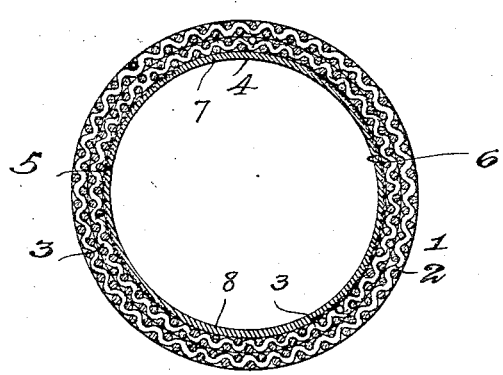
Witnesses,
Inventor
Robert Many
By Frank L. Belknap, Atty.

UNITED STATES PATENT OFFICE.

ROBERT MANY, OF OAK PARK, ILLINOIS.

HOSE CONSTRUCTION.

1,149,664.  Specification of Letters Patent.  Patented Aug. 10, 1915.

Application filed February 23, 1915. Serial No. 9,869.

*To all whom it may concern:*

Be it known that I, ROBERT MANY, a citizen of the United States, residing in the village of Oak Park, county of Cook, and State of Illinois, have invented certain new and useful Improvements in Hose Construction, of which the following is a specification.

My invention relates to hose construction, and is especially adapted to fire and mill hose of the larger sizes, though in its broader aspects the invention is not limited to any particular size or type of hose.

The salient objects of the invention are to provide an improved reinforcement for the inner elastic lining, which is employed with an incasing jacket, the lining and jacket being adapted to lie flat when not in use; to provide a means for reinforcing the lining and protecting the edges from pinching, the reinforcing fabric being so constructed and arranged relative to the lining that it will not interfere with the proper expansion of the latter; to provide a construction in which the reinforcing fabric extends longitudinally of the lining, there being an intermediate longitudinal portion not covered by the reinforcing fabric; to provide a construction in which the reinforcing fabric is cut on the bias, so that its threads extend diagonally with relation to its sides and the direction of the length of the lining; to utilize this diagonal relation of the threads for permitting greater flexibility to the lining while at the same time fully protecting the edge portions of the lining in its flattened position; to provide a construction in which the incasing jacket is entirely separate from the elastic lining, which it incases, so as to permit the separation of the lining from the jacket for repair or renewal of either elements; and in general to provide an improved construction of hose, which can be economically manufactured and which will withstand the wear to which hose of this character is subjected.

In the drawings—Figure 1 is a side elevation of the hose in the flattened position, portions of the different elements being broken away; Fig. 2 is a similar top plan view; Fig. 3 is a cross-section on the line 3—3 of Fig. 1, and Fig. 4 is a cross-section through the hose in the inflated position.

Referring to the particular embodiment of my invention shown in the drawings, 1 designates as a whole the incasing jacket, which comprises two independent sections 2 and 3 formed of woven cotton fabric or the like. This jacket is constructed to normally lie flat when not inflated, and constitutes an outer protective casing, which surrounds a tubular lining 4 formed of rubber or other elastic material. The incasing jacket and the elastic lining are preferably formed separate, and my invention contemplates an improved reinforcement for the lining 4, this reinforcement further serving to hold the lining out of contact with the incasing jacket and protecting the lining from rubbing against the rough interior surface of the jacket.

In the particular construction shown, two strips 5 and 6 of a woven fabric are adhesively secured to the rubber lining 4, the strips being of such width as to leave intermediate portions 7 and 8 to which there is no fabric secured, this allowing for expansion of the rubber lining. The fabric members 5 and 6 are secured to that portion of the lining, which forms the sides or bend portions of the elastic lining 4 when the hose is in a flattened position. By so positioning the fabric the binding or pinching of the edge portions is prevented, and the lining returns to its normally flattened position when empty. The intermediate portions 7 and 8 to which there is no fabric secured are so positioned that they are not subjected to the friction and strain caused by the alternate inflating and flattening of the hose. Thus means are provided for permitting the expansion of the inner lining without materially weakening of the reinforcement formed by the strips 5 and 6.

Additional means are provided for allowing the inner elastic lining to freely expand, and the novel means employed for this additional expansion forms an important feature of my invention. As clearly shown in Fig. 2, the fabric, which comprises the reinforcing members 5 and 6, is cut on the bias—that is, its threads 9 and 10 extend diagonally or obliquely with relation to its sides. Also the fabric members 5 and 6 are mounted on the rubber lining 4 so that the threads 9 and 10 of the fabric extend diagonally or obliquely with relation to the longitudinal direction of the lining. In use the reinforcing fabric members 5 and 6 will serve to hold the lining out of contact with the surface of the incasing jacket, and will normally return the lining to its flattened position, and inasmuch as there are intermediate longitudinal portions to which there is no fabric secured, the lining is free to expand in that portion. The diagonally extending threads of the fabric will also aid in permitting this expansion, since they will tend to straighten out toward parallel and perpendicular lines relative to the lining. A further advantage is derived in that the strain does not come entirely upon the portion directly adjacent the intermediate portions 7 and 8, but is distributed through the fabric member by means of the diagonally extending threads.

The construction above described is one, which can be economically manufactured while the flexibility is maintained, and at the same time the elastic lining is reinforced where necessary. Moreover, since the reinforcing fabric members 5 and 6 extend in parallelism to the longitudinal direction of the lining 4, the fabric can be applied without rotating either it or the lining relative to the other. While I preferably employ two reinforcing fabrics 5 and 6 as shown in the drawings, it is obvious that a single fabric member could be employed or a greater number than two without departing from the scope of my invention. Also a fabric having the diagonally extending threads can be employed in other positions relative to the inner elastic lining, and I do not desire to limit my invention except as specified in the appended claim.

I claim as my invention:

In a hose construction and in combination, an inclosing casing for limiting the expansion of an inner fluid-conveying tube and for protecting the same, and an inner fluid-conveying tube adapted to be slipped into the casing and to be held therein unattached, throughout the major portion of the length thereof and throughout the circumference of the same, to the inner wall of said casing, said casing and tube being designed, when out of use, to assume a collapsed, flattened condition, folded along diametrically opposed lengthwise lines, and said inner tube having fixedly secured to the opposite surface thereof at diametrically opposite points at and adjacent to its line of fold reinforcing fabric strips, and having the remaining portions thereof constituting the intermediate portions of the longer sides of the flattened tube freely expansible.

ROBERT MANY.

Witnesses:
C. B. BELKNAP,
JOYCE M. LUTZ.

Copies of this patent may be obtained for five cents each, by addressing the "Commissioner of Patents, Washington, D. C."